US012756078B2

(12) United States Patent
Wu et al.

(10) Patent No.: US 12,756,078 B2
(45) Date of Patent: Oct. 6, 2026

(54) BATTERY CELL, BATTERY, AND POWER CONSUMING DEVICE

(71) Applicant: CONTEMPORARY AMPEREX TECHNOLOGY CO., LIMITED, Ningde (CN)

(72) Inventors: Kai Wu, Ningde (CN); Wenfa Lin, Ningde (CN); Congsheng Chen, Ningde (CN); Yu Ding, Ningde (CN); Biao Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/294,292

(22) Filed: Aug. 8, 2025

(65) Prior Publication Data

US 2025/0364708 A1 Nov. 27, 2025

Related U.S. Application Data

(63) Continuation of application No. PCT/CN2024/088062, filed on Apr. 16, 2024.

(30) Foreign Application Priority Data

Sep. 26, 2023 (CN) ........................ 202311251687.1

(51) Int. Cl.
*H01M 50/593* (2021.01)
*H01M 50/103* (2021.01)
(Continued)

(52) U.S. Cl.
CPC ....... *H01M 50/593* (2021.01); *H01M 50/103* (2021.01); *H01M 50/536* (2021.01); *H01M 50/636* (2021.01); *H01M 2220/20* (2013.01)

(58) Field of Classification Search
CPC .................................................. H01M 50/593
See application file for complete search history.

(56) References Cited

U.S. PATENT DOCUMENTS

2023/0118437 A1 4/2023 Fang et al.
2023/0123195 A1 4/2023 Fang et al.

FOREIGN PATENT DOCUMENTS

CN 201466087 U 5/2010
CN 217589153 U 10/2022
(Continued)

OTHER PUBLICATIONS

Office Action (with English Machine Translation), mailed Aug. 28, 2025, for corresponding Chinese Patent Application Serial No. 202311251687.1.

(Continued)

*Primary Examiner* — Stephan J Essex
(74) *Attorney, Agent, or Firm* — K&L Gates LLP

(57) ABSTRACT

A battery cell, a battery, and a power consuming device are disclosed. The battery cell includes a first housing wall, an electrode post, and an insulating sealing structure. The first housing wall has a mounting hole. The electrode post includes a pass-through portion that extends through the mounting hole and a first extending portion connected to the pass-through portion. The first extending portion extends away from the central axis of the mounting hole to either the outer side of the outer surface or the inner side of the inner surface of the first housing wall. The insulating sealing structure is disposed between the electrode post and the first housing wall. The first extending portion includes a first section and a second section arranged in sequence along the outward direction, and the second section applies greater pressure to the insulating sealing structure than the first section.

21 Claims, 6 Drawing Sheets

(51) Int. Cl.
*H01M 50/536* (2021.01)
*H01M 50/636* (2021.01)

(56) References Cited

FOREIGN PATENT DOCUMENTS

| | | | | | |
|---|---|---|---|---|---|
| CN | 218456110 | U | | 2/2023 | |
| CN | 218769992 | U | | 3/2023 | |
| CN | 219203434 | U | * | 6/2023 | .......... H01M 50/627 |
| CN | 116581447 | A | | 8/2023 | |
| CN | 219739237 | U | | 9/2023 | |
| EP | 4113558 | A1 | | 1/2023 | |
| EP | 4199207 | A1 | | 6/2023 | |
| EP | 4224618 | A1 | | 8/2023 | |
| JP | H08203494 | A | | 8/1996 | |
| JP | 2015022941 | A | | 2/2015 | |
| JP | 2023062843 | A | | 5/2023 | |
| KR | 20220142185 | A | | 10/2022 | |
| WO | 2010/134155 | A1 | | 11/2010 | |
| WO | WO-2015115557 | A1 | * | 8/2015 | ............... F16J 15/10 |

OTHER PUBLICATIONS

The International Search Report received in the counterpart International Application No. PCT/CN2024/088062, dated Jul. 13, 2024, 5 pages with English translation.

The ISA Written Opinion received in the counterpart International Application No. PCT/CN2024/088062, dated Jul. 13, 2024, 10 pages with English translation.

Office Action (with English Machine Translation), mailed Mar. 6, 2026, for corresponding Chinese Patent Application Serial No. 202311251687.1.

Extended European Search Report, mailed Mar. 16, 2026, for corresponding European Patent Application Serial No. 24869672.6.

Office Action (with English Machine Translation), mailed Jun. 5, 2026, for corresponding Chinese Patent Application Serial No. 202311251687.1.

Office Action (with English Machine Translation), mailed Jun. 23, 2026, for corresponding Japanese Patent Application Serial No. 2025-537997.

* cited by examiner

BATTERY CELL, BATTERY, AND POWER CONSUMING DEVICE

CROSS-REFERENCE TO RELATED APPLICATIONS

The present application is a continuation of International Application No. PCT/CN2024/088062, filed on Apr. 16, 2024, which claims priority to and benefits of Chinese Patent Application No. 202311251687.1, filed on Sep. 26, 2023. The entire content of the above-referenced application is incorporated herein by reference.

TECHNICAL FIELD

The present application relates to the field of battery technologies, and in particular, to a battery cell, a battery, and a power consuming device.

BACKGROUND

In recent years, new energy automobiles have been rapidly developed. In the field of electric automobiles, a power battery, as a power source of an electric automobile, plays an important role that is irreplaceable. The power battery includes several battery cells. However, the reliability of the battery cell is to be improved.

SUMMARY

Embodiments of the present application provide a battery cell, a battery, and a power consuming device, which can improve the reliability of the battery cell.

According to a first aspect, an embodiment of the present application provides a battery cell, including: a first housing wall, an electrode post, and an insulating sealing structure. The first housing wall is provided with a mounting hole, the electrode post includes a pass-through portion passing through the mounting hole and a first extending portion that is connected to the pass-through portion and extends, relative to the pass-through portion, toward a direction away from a central axis of the mounting hole, the first extending portion extends to an outer side of an outer surface or an inner side of an inner surface of the first housing wall, and the insulating sealing structure is fitted between the electrode post and the first housing wall. The first extending portion includes a first section portion and a second section portion that are sequentially arranged in the direction away from the central axis of the mounting hole, and the second section portion presses against the insulating sealing structure to a greater degree than the first section portion.

In the foregoing technical solution, the second section portion is set to press against the insulating sealing structure to a greater degree than the first section portion. In this way, when the second section portion on an outer side of the first section portion tilts up under influence of welding, the second section portion presses against the insulating sealing structure to a greater degree than the first section portion, so that a problem that the insulating sealing structure is not compressed enough since the second section portion tilts up can be alleviated, thereby improving the sealing reliability between the electrode post and a housing and improving the reliability of the battery cell.

In some embodiments, a compression amount of the second section portion on the insulating sealing structure is greater than a compression amount of the first section portion on the insulating sealing structure.

In the foregoing technical solution, the second section portion has a greater compression amount on the insulating sealing structure than the first section portion, so that when the compression amount of the first section portion on the insulating sealing structure meets a requirement, the compression amount of the second section portion on the insulating sealing structure has a compression margin, to present an effect that the second section portion presses against the insulating sealing structure to a greater degree than the first section portion. In this way, when the second section portion tilts up, a compression amount loss caused by tilting of the second section portion may be made up through the compression margin, so that the compression amount of the second section portion that tilts up on the insulating sealing structure still meets the compression amount requirement, thereby improving the sealing performance between the housing and the electrode post, alleviating a leakage problem, and improving the reliability of the battery cell.

In some embodiments, a side surface of the first section portion close to the first housing wall is a first surface, a side surface of the second section portion close to the first housing wall is a second surface, and the second surface protrudes, relative to the first surface, toward a direction close to the first housing wall.

In the foregoing technical solution, by causing the second section portion to protrude toward the direction close to the first housing wall, it is easy to implement that the second section portion has a greater compression amount on the insulating sealing structure than the first section portion, so that a specific compression margin may be reserved. In this way, when the second section portion tilts up relative to the first section portion and has a relatively great tilting amplitude, the compression amount loss caused by tilting of the second section portion may be made up through the compression margin. Therefore, the compression amount of the second section portion on the insulating sealing structure is still enough to keep the sealing performance, thereby alleviating a problem of deterioration of the sealing performance between the housing and the electrode post caused by tilting of the second section portion. By causing the second section portion to protrude toward the direction close to the first housing wall to increase a thickness of the second section portion, it is easy to implement that the second section portion has greater mass per unit area than the first section portion, so that tilting difficulty of the second section portion may be increased, and a tilting amplitude of the second section portion is reduced, thereby alleviating a problem of poor sealing between the electrode post and the housing since the insulating sealing structure cannot be pressed against due to a great tilting amplitude of the second section portion.

In some embodiments, the first surface obliquely extends, in the direction away from the central axis of the mounting hole, toward the direction close to the first housing wall.

In the foregoing technical solution, a problem of a large step formed at a joint between the first surface of the first section portion and the second surface of the second section portion may be alleviated, to alleviate a problem of cracking caused by large deformation, thereby improving the structural reliability of the first extending portion.

In some embodiments, the first surface and the second surface are connected through a line or connected through a chamfer.

In the foregoing technical solution, no step is formed at the joint between the first surface and the second surface, so that the problem of cracking of the first extending portion at the joint may be alleviated, and a problem of cracking of the insulating sealing structure at the corresponding joint caused by concentrated stress may be alleviated, thereby protecting the insulating sealing structure.

In some embodiments, a thickness of the second section portion in an axial direction of the mounting hole is greater than a thickness of the first section portion in the axial direction of the mounting hole.

In the foregoing technical solution, the thickness of the second section portion is increased and it is defined that a thickness increasing direction of the second section portion is a direction facing the first housing wall, so that the second section portion may have a greater compression amount on the insulating sealing structure to reserve a specific compression margin to make up for the compression amount loss caused by at least partial tilting of the second section portion, and the mass of the second section portion may be increased to increase the tilting difficulty of the second section portion, to further reduce the tilting amplitude of the second section portion, so as to alleviate a problem of an insufficient compression amount of the insulating sealing structure caused by tilting of the second section portion, thereby improving the sealing performance between the electrode post and the housing.

In some embodiments, a side surface of the second section portion away from the first housing wall is flush with a side surface of the first section portion away from the first housing wall.

In the foregoing technical solution, a structure and processing of the first extending portion may be simplified.

In some embodiments, at least a half of an extension dimension of the first extending portion in the direction away from the central axis of the mounting hole abuts against the first housing wall.

In the foregoing technical solution, the first extending portion may have a long dimension to abut against the first housing wall, so that the insulating sealing structure may be effectively pressed against, improving the sealing reliability.

In some embodiments, the electrode post further includes a second extending portion that is connected to the pass-through portion and extends, relative to the pass-through portion, toward the direction away from the central axis of the mounting hole, the second extending portion and the first extending portion respectively extend to an inner side and an outer side of the first housing wall, the insulating sealing structure includes a first insulating sealing member that is at least partially arranged between the first extending portion and the first housing wall and a second insulating sealing member that is at least partially arranged between the second extending portion and the first housing wall, and material hardness of the first insulating sealing member is greater than material hardness of the second insulating sealing member.

In the foregoing technical solution, a pressing force applied by the first extending portion to the first insulating sealing member may be well transmitted to the second insulating sealing member, so that the second insulating sealing member can be well compressed. Therefore, a compression amount of the first insulating sealing member may be less than a compression amount of the second insulating sealing member, and both the first insulating sealing member and the second insulating sealing member may well play a sealing effect.

In some embodiments, a shape of a side surface of the first insulating sealing member away from the first housing wall matches a shape of a side surface of the first extending portion facing the first housing wall.

In the foregoing technical solution, a contact area between the first insulating sealing member and the first extending portion may be increased, to reduce a problem of cracking of the first insulating sealing member caused by local acting force concentration. In addition, when the second section portion protrudes, relative to the first section portion, toward the direction close to the first housing wall, the first extending portion and the first insulating sealing member may form concave-convex matching through shaping matching to play a limiting function, which is conducive to alleviating problems of movement or loosening of the first insulating sealing member in a vibration or impact process of the battery cell, so that the arrangement stability of the first insulating sealing member is improved, and the first insulating sealing member plays a reliable insulating sealing effect.

In some embodiments, the electrode post includes an electrode post body and an electrode post cover plate, the electrode post body includes the first extending portion and the second extending portion, the first extending portion extends to the outer side of the outer surface of the first housing wall, the electrode post cover plate covers an outer side of the electrode post body, and the electrode post body is welded to the electrode post cover plate.

In the foregoing technical solution, the electrode post cover plate covers the outer side of the electrode post body, so that the electrode post cover plate is arranged closer to the first extending portion than the second extending portion, and heat generated due to welding the electrode post cover plate to the electrode post body is more conducted to the first insulating sealing member relative to the second insulating sealing member. The material hardness of the first insulating sealing member is greater than the material hardness of the second insulating sealing member, so that a heat resistance capability of the first insulating sealing member is stronger than a heat resistance capability of the second insulating sealing member. For example, the first insulating sealing member is a plastic member, and the second insulating sealing member is a rubber member, so that when the electrode post cover plate is welded to the electrode post body, thermal influence caused to the second insulating sealing member may be reduced as much as possible, thereby improving the sealing reliability between the first housing wall and the electrode post.

In some embodiments, the first extending portion protrudes from the pass-through portion toward an outer side of the first housing wall, to define a depressed groove between the first extending portion and the pass-through portion, an edge of the electrode post cover plate is arranged in the depressed groove and is welded to the pass-through portion in a pass-through manner, and a welding structure formed through welding is separated from the first extending portion.

In the foregoing technical solution, shrinkage stress generated due to solidification of a molten pool formed by the welding may be separated by the foregoing gap, and the shrinkage stress is hardly or less transmitted to the first extending portion, so that a tilting problem of the first extending portion may be alleviated, and the first extending portion may press against the insulating sealing structure, thereby improving an insulating sealing effect. In addition, the edge of the electrode post cover plate is arranged in the depressed groove and is welded to the pass-through portion in a pass-through manner rather than being butt welded to the first extending portion, so that there is no need to ensure a small assembly gap between the edge of the electrode post cover plate and the first extending portion to meet a butt welding requirement, and the gap between the edge of the electrode post cover plate and the first extending portion may be large. Therefore, the compatibility of the electrode post body is improved, which is conducive to reducing the processing precision of the electrode post cover plate and the electrode post body.

In some embodiments, the electrode post forms the first extending portion through flanging riveting.

In the foregoing technical solution, processing of the electrode post is convenient, and the connection reliability of the first extending portion and the pass-through portion may be improved, thereby improving the assembly reliability of the electrode post and the first housing wall. For example, before the first extending portion is riveted, the first extending portion may be set as a protruding structure at an outer edge of the outer surface, after the first extending portion is flanged and riveted, an obtained third surface of the first section portion is flush with an obtained fourth surface of the second section portion, and the second surface of the second section portion protrudes, relative to the first surface of the first section portion, toward the first housing wall. In this way, during flanging riveting, the second section portion has a greater compression amount on the insulating sealing structure than the first section portion, so that the compression margin of the corresponding second section portion is obtained, alleviating a problem of poor sealing caused by tilting of the second section portion.

In some embodiments, mass per unit area of the second section portion is greater than mass per unit area of the first section portion.

In the foregoing technical solution, the second section portion has greater mass per unit area than the first section portion, so that the tilting difficulty of the second section portion than the first section portion may be increased, to present an effect that the second section portion presses against the insulating sealing structure to a greater degree than the first section portion. In this way, the tilting amplitude of the second section portion may be reduced to a specific degree, so that a problem of poor sealing between the electrode post and the housing since the insulating sealing structure cannot be pressed against due to a large tilting amplitude of the second section portion may be alleviated, thereby improving the sealing performance between the housing and the electrode post, alleviating a leakage problem, and improving the reliability of the battery cell. In addition, by setting the second section portion to have greater mass per unit area than the first section portion, it is easy to implement that the second section portion has a greater compression amount on the insulating sealing structure than the first section portion, so that not only the compression margin may be used to make up for the compression amount loss caused by tilting of the second section portion, but also the tilting amplitude of the second section portion may be reduced, thereby more effectively improving the sealing performance between the housing and the electrode post, alleviating a leakage problem, and improving the reliability of the battery cell.

In some embodiments, a thickness of the second section portion is greater than a thickness of the first section portion; and/or a density of the second section portion is greater than a density of the first section portion.

In the foregoing technical solution, by setting the second section portion to be greater than the first section portion in at least one of a thickness and a density, it is easy to implement that the second section portion has greater mass per unit area than the first section portion, so that the structural complexity of the first extending portion may be reduced, and the design and processing difficulty of the first extending portion may be reduced.

In some embodiments, the battery cell is provided with an accommodating cavity on an inner side of the first housing wall, the electrode post includes the electrode post body, an accommodating groove opened toward a direction away from the accommodating cavity is formed on the electrode post body, a communication hole is provided on the electrode post body, and the communication hole penetrates a side groove wall of the accommodating groove close to the accommodating cavity and communicates the accommodating cavity with the accommodating groove.

In the foregoing technical solution, when an electrolyte is injected into the battery cell, the electrolyte may be injected into the accommodating groove and flows toward the accommodating cavity through the communication hole, where the accommodating groove may buffer the electrolyte to alleviate a problem of splashing or overflowing of the electrolyte. In addition, a side wall of the accommodating groove may prevent the electrolyte from splashing to a specific degree, thereby reducing pollution caused by the electrolyte to the outside and facilitating fast liquid injection. In addition, there is no need to separately provide a liquid injection channel on the housing, so that there is no need to perform special processing on the housing, which is conducive to reducing the structural complexity and the processing difficulty of the housing.

In some embodiments, the battery cell includes a battery cell assembly, the battery cell assembly includes an active substance coated portion accommodated in the accommodating cavity and a conductive portion connected to the active substance coated portion, and the conductive portion passes through the communication hole to be at least partially accommodated in the accommodating groove.

In the foregoing technical solution, at least a part of the conductive portion is accommodated in the accommodating groove, so that the at least a part of the conductive portion occupies a space in the accommodating groove, space occupation of the conductive portion in the accommodating cavity may be reduced, and a space in the accommodating cavity is saved to accommodate the active substance coated portion with a greater volume, which is conducive to improving an energy density of the battery cell or is conducive to reducing a size of the battery cell while the energy density of the battery cell remains unchanged.

In some embodiments, the electrode post includes the electrode post cover plate covering the electrode post body, a liquid injection hole that is capable of being in communication with the accommodating groove is formed on the electrode post cover plate, and the battery cell further includes a sealing structure configured to seal the liquid injection hole.

In the foregoing technical solution, the liquid injection hole is processed on the electrode post cover plate, so that an opened hole is small and a position is close to the outside, making it easy to reliably seal a liquid injection entrance through the sealing structure, thereby improving the operating reliability of the battery cell and implementing flexible and diversified design of the sealing structure.

According to a second aspect, an embodiment of the present application further provides a battery, including the battery cell according to any one of the foregoing solutions.

In the foregoing technical solution, the reliability of the battery cell according to the embodiments of the present application is improved, so that the performance of the battery may be improved.

According to a third aspect, an embodiment of the present application further provides a power consuming device, including the battery according to any one of the foregoing solutions.

In the foregoing technical solution, the performance of the battery is improved, so that the operating power consuming performance of the power consuming device may be improved.

BRIEF DESCRIPTION OF THE DRAWINGS

To describe the technical solutions of the embodiments of the present application more clearly, the following briefly describes the accompanying drawings required for describing the embodiments. It should be understood that, the following accompanying drawings show only some embodiments of the present application, which should not be considered as a limitation on the scope. A person of ordinary skill in the art may still derive other related accompanying drawings according to the accompanying drawings without creative efforts.

REFERENCE NUMERALS

Figure 1:
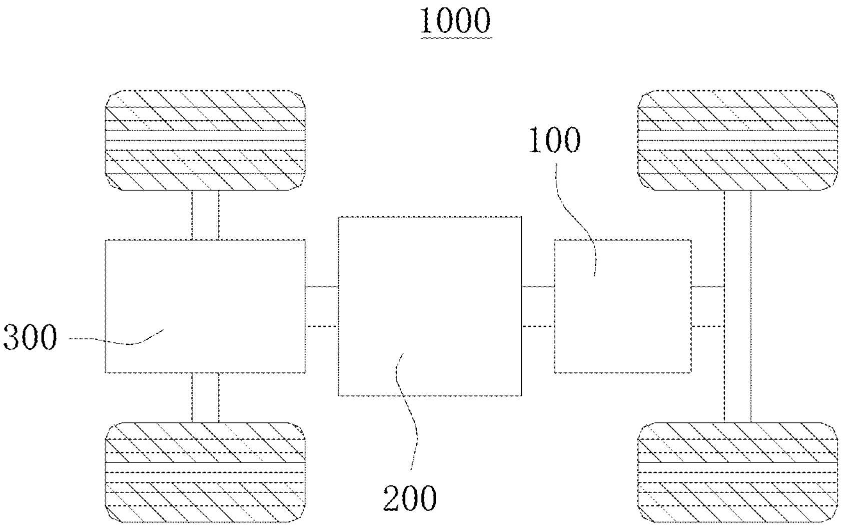
FIG. 1 is a schematic structural diagram of a vehicle according to some embodiments of the present application.

1000—Vehicle; X—First direction; Y—Second direction; Z—Third direction; 100—Battery; 200—Controller; 300—Motor; 101—Box; 1011—First box body; 1012—Second box body; 102—Battery cell; 103—Bus component; 1—Housing; 11—Accommodating cavity; 12—Mounting hole; L—Central axis; 13—First housing wall; 14—Second housing wall; 2—Electrode post; 3—Electrode post body; 31—Depressed groove; 32—First extending portion; 321—First section portion; 3211—First surface; 3212—Third surface; 322—Second section portion; 3221—Second surface; 3222—Fourth surface; 33—Pass-through portion; 36—Accommodating groove; 37—Communication hole; 38—Second extending portion; 39—Support portion; 4—Electrode post cover plate; 43—Liquid injection hole; 6—Sealing structure; 61—First sealing member; 62—Second sealing member; 7—Battery cell assembly; 71—Active substance coated portion; 72—Conductive portion; 8—Insulating sealing structure; 81—First insulating sealing member; 82—Second insulating sealing member; 821—First part; and 822—Second part.

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are merely some embodiments of the present application rather than all of the embodiments. All other embodiments obtained by a person of ordinary skill in the art based on the embodiments of the present application without making creative efforts shall fall within the protection scope of the present application.

Unless otherwise defined, meanings of all technical and scientific terms used in the present application are the same as those usually understood by a person skilled in the art to which the present application belongs. In the present application, the terms used in the specification of the present application are merely intended to describe objectives of specific embodiments, but are not intended to limit the present application. The terms “include”, “comprise”, and any variant thereof in the description and the claims of the present application and the description of the accompanying drawings are intended to cover non-exclusive inclusion. The terms “first”, “second”, and the like in the specification and claims of the present application or the accompanying drawings are intended to distinguish different objects, and are not intended to describe a specific order or primary-secondary relationship.

“Embodiment” mentioned in the present application means that specific features, structures, or characteristics described with reference to the embodiment may be included in at least one embodiment of the present application. The term appearing at different positions of the specification may not refer to the same embodiment or an independent or alternative embodiment that is mutually exclusive with another embodiment.

In the description of the present application, it should be noted that, unless otherwise explicitly specified or defined, the terms such as “mount”, “connect”, “connection”, and “attach” should be understood in a broad sense. For example, the connection may be a fixed connection, a detachable connection, or an integral connection; or may be a direct connection, an indirect connection through an intermediary, or internal communication between two elements. A person of ordinary skill in the art may understand specific meanings of the foregoing terms in the present application according to specific situations.

The term “and/or” in the present application only describes an association relationship for describing associated objects and represents that three relationships may exist. For example, A and/or B may represent the following three cases: Only A exists, both A and B exist, and only B exists. In addition, the character “/” in the present application generally indicates an “or” relationship between the associated objects.

In the embodiments of the present application, same reference numerals represent same components, and for brevity, detailed description of the same components is omitted in different embodiments. It should be understood that the dimensions such as the thickness, the length, and the width of various components in the embodiments of the present application and the entire thickness, length, and width of an integrated device are merely exemplary description, and should not be construed as any limitation to the present application.

"A Plurality of" appearing in the present application means two or more (including two).

In the present application, a battery cell may include a lithium-ion secondary battery, a lithium-ion primary battery, a lithium-sulfur battery, a sodium-lithium-ion battery, a sodium-ion battery, a magnesium-ion battery, or the like, which is not limited in the embodiments of the present application. The battery cell may be cylindrical, flat-shaped, cuboid-shaped, or in another shape, which is not limited in the embodiments of the present application. Generally, the battery cell is divided into three types according to encapsulating methods: a cylindrical battery cell, a prismatic battery cell, and a soft package battery cell, which is also not limited in the embodiments of the present application.

A battery mentioned in the embodiments of the present application is a single physical module including one or more battery cells to provide a higher voltage and a higher capacity. For example, the battery mentioned in the present application may include a battery module, a battery pack, or the like. The battery module generally includes a plurality of battery cells. The battery pack generally includes a box configured to encapsulate one or more battery cells or one or more battery modules. The box may prevent liquid or other foreign objects from affecting charging or discharging of the battery cell.

The battery cell includes a housing, a battery cell assembly, and an electrolyte, where the housing is configured to accommodate the battery cell assembly and the electrolyte. The battery cell assembly includes at least one electrode assembly, and the electrode assembly includes a positive electrode plate, a negative electrode plate, and a separator. The electrode assembly may be a wound structure, a laminated structure, or the like. The battery cell works mainly relying on movement of metal ions between the positive electrode plate and the negative electrode plate.

The positive electrode plate generally may include a positive electrode current collector and a positive electrode active substance layer, the positive electrode active substance layer is directly or indirectly coated on the positive electrode current collector, the positive electrode current collector not coated with the positive electrode active substance layer protrudes out of the positive electrode current collector already coated with the positive electrode active substance layer, and the positive electrode current collector not coated with the positive electrode active substance layer is used as a positive electrode tab. By using a lithium-ion battery as an example, a material of the positive electrode current collector may be aluminum, and a material of the positive electrode active substance layer may be lithium cobalt oxide, lithium iron phosphate, ternary lithium, lithium manganese oxide, or the like.

The negative electrode plate generally may include a negative electrode current collector and a negative electrode active substance layer, the negative electrode active substance layer is directly or indirectly coated on the negative electrode current collector, the negative electrode current collector not coated with the negative electrode active substance layer protrudes out of the negative electrode current collector already coated with the negative electrode active substance layer, and the negative electrode current collector not coated with the negative electrode active substance layer is used as a negative electrode tab. A material of the negative electrode current collector may be copper, and a material of the negative electrode active substance layer may be carbon, silicon, or the like.

To ensure that no fusing occurs when a large current passes through, there are a plurality of positive electrode tabs and the positive electrode tabs are stacked to form a positive electrode tab portion, and there are a plurality of negative electrode tabs and the negative electrode tabs are stacked to form a negative electrode tab portion. An electrode post is arranged on the housing, the positive electrode tab portion is electrically connected to a positive electrode post, and the negative electrode tab portion is electrically connected to a negative electrode post. For example, the tab portion may be connected to the electrode post, to form a direct electrical connection between the tab portion and the electrode post. For another example, the battery cell assembly may include an adapting piece, the tab portion is connected to the adapting piece, and the adapting piece is connected to the electrode post, to form an indirect electrical connection between the tab portion and the electrode post.

A material of the separator is not limited, and may be, for example, polypropylene or polyethylene.

In some battery cells in the related art, an electrode post is arranged on the housing, and the electrode post is electrically connected to the battery cell assembly accommodated in the housing, to implement electrode output, and an insulating sealing structure is arranged between the electrode post and the housing. The electrode post passes through the housing and includes a stop edge stopped on an inner side and an outer side of the housing. The stop edge easily tilts up under influence of welding, and a smaller distance between the stop edge and an edge indicates a greater tilting amplitude and greater difficulty in pressing against the insulating sealing structure, leading to an insufficient compression amount of the insulating sealing structure, and affecting a sealing effect between the housing and the electrode post.

In view of this, an embodiment of the present application provides a battery cell, including: a housing, an electrode post, and an insulating sealing structure. The housing includes a first housing wall, the first housing wall is provided with a mounting hole, the electrode post includes a pass-through portion passing through the mounting hole and a first extending portion that is connected to the pass-through portion and extends, relative to the pass-through portion, toward a direction away from a central axis of the mounting hole, the first extending portion extends to an outer side of an outer surface or an inner side of an inner surface of the first housing wall, and the insulating sealing structure is fitted between the electrode post and the first housing wall. The first extending portion includes a first section portion and a second section portion that are sequentially arranged in the direction away from the central axis of the mounting hole, and the second section portion presses against the insulating sealing structure to a greater degree than the first section portion.

Based on this, the second section portion is set to press against the insulating sealing structure to a greater degree than the first section portion. In this way, when the second section portion on an outer side of the first section portion tilts up under influence of welding, the second section portion presses against the insulating sealing structure to a greater degree than the first section portion, so that a problem that the insulating sealing structure is not compressed enough since the second section portion tilts up can be alleviated, thereby improving the sealing reliability between the electrode post and a housing and improving the reliability of the battery cell.

An embodiment of the present application provides a power consuming device using a battery as a power supply. The power consuming device may be, but is not limited to, a mobile phone, a tablet, a laptop, an electric toy, an electric tool, a battery car, an electric automobile, a ship, a spacecraft, or the like. The electric toy may include a fixed or mobile electric toy, for example, a game console, an electric automobile toy, an electric ship toy, and an electric airplane toy. The spacecraft may include an airplane, a rocket, a spacecraft, a spaceship, and the like.

For ease of description in the following embodiments, an example in which a power consuming device in an embodiment of the present application is a vehicle 1000 is used for description.

Referring to FIG. 1, FIG. 1 is a schematic structural diagram of a vehicle 1000 according to some embodiments of the present application. The vehicle 1000 may be a fuel powered vehicle, a gas powered vehicle, or a new energy vehicle. The new energy vehicle may be a pure electric vehicle, a hybrid electric vehicle, an extended range vehicle, or the like. A battery 100 is disposed inside the vehicle 1000, and the battery 100 may be disposed at a bottom, head, or tail of the vehicle 1000. The battery 100 may be configured to supply power to the vehicle 1000. For example, the battery 100 may be used as an operating power supply of the vehicle 1000. The vehicle 1000 may further include a controller 200 and a motor 300. The controller 200 is configured to control the battery 100 to supply power to the motor 300, for example, to meet operating electricity requirements during starting, navigation, and traveling of the vehicle 1000.

In some embodiments of the present application, the battery 100 may serve not only as an operating power supply of the vehicle 1000, but also as a driving power supply of the vehicle 1000, to alternatively or partially replace fuel or natural gas to provide driving power for the vehicle 1000.

Figure 2:
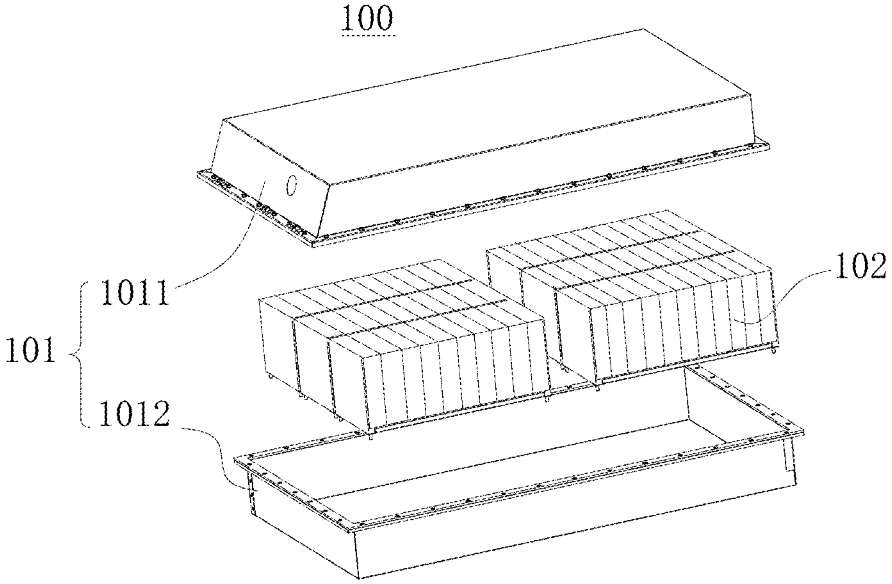
FIG. 2 is a structure exploded view of a battery according to some embodiments of the present application.

Referring to FIG. 2, FIG. 2 is a structural exploded view of a battery 100 according to some embodiments of the present application. The battery 100 includes a box 101 and a plurality of battery cells 102, where the battery cells 102 are accommodated in the box 101. The box 101 is configured to provide an assembly space for the battery cells 102, and the box 101 may use a plurality of structures. In some embodiments, the box 101 may include a first box body 1011 and a second box body 1012, the first box body 1011 and the second box body 1012 cover each other, and the first box body 1011 and the second box body 1012 jointly define the assembly space for accommodating the battery cells 102. The second box body 1012 may be a hollow structure being open on one side, the first box body 1011 may be a plate-like structure, and the first box body 1011 covers an open side of the second box body 1012, so that the first box body 1011 and the second box body 1012 jointly define the assembly space. Alternatively, each of the first box body 1011 and the second box body 1012 may be a hollow structure being open on one side, and an open side of the first box body 1011 covers an open side of the second box body 1012. Certainly, the box 101 formed by the first box body 1011 and the second box body 1012 may be in various shapes, such as a cylinder or a cuboid.

In the battery 100, the plurality of battery cells 102 may be connected in series, parallel, or series-parallel. The series-parallel connection means that both series connection and parallel connection exist among the plurality of battery cells 102. The plurality of battery cells 102 may be directly connected in series, parallel, or series-parallel together, and then a whole formed by the plurality of battery cells 102 may be accommodated in the box 101. Certainly, the battery 100 may alternatively be in the form of a plurality of battery modules formed by the plurality of battery cells 102 that are first connected in series, parallel, or series-parallel, and the plurality of battery modules are then connected in series, parallel, or series-parallel to form a whole and accommodated in the box 101. The battery 100 may also include other structures, for example, the battery 100 may further include a bus component for implementing electrical welding between the plurality of battery cells 102.

Figure 3:
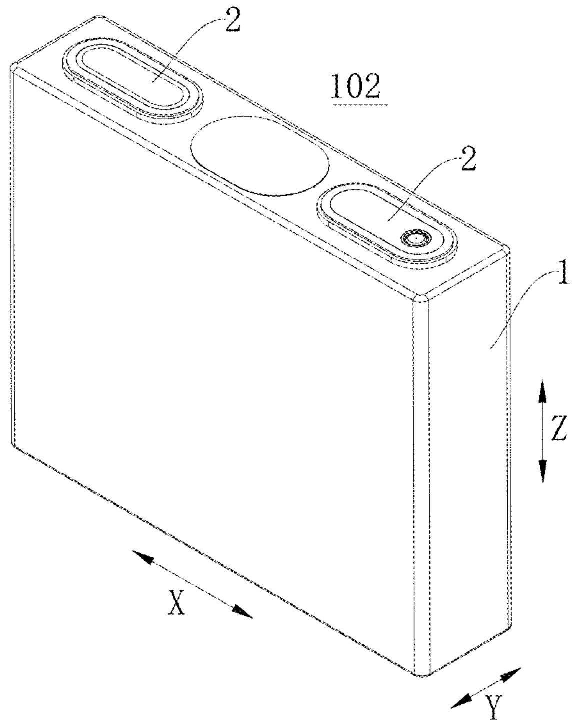
FIG. 3 is a schematic structural diagram of a battery cell according to some embodiments of the present application.
Figure 4:
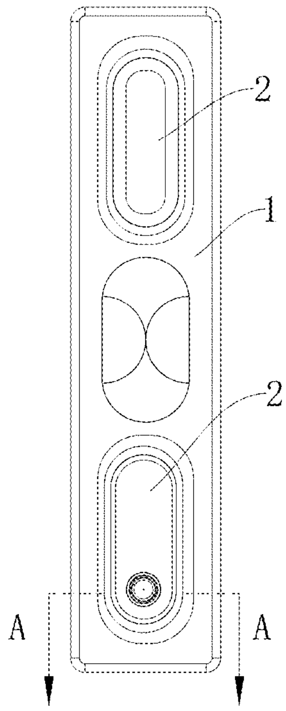
FIG. 4 is a schematic diagram of an orthographic projection of a battery cell according to some embodiments of the present application.

The battery cell 102 may be a secondary battery or a primary battery; or the battery cell may alternatively be a lithium-sulfur battery, a sodium-ion battery, or a magnesium-ion battery, but is not limited thereto. The battery cell 102 may be cylindrical, flat-shaped, cuboid-shaped, or in another shape. For example, referring to the embodiment shown in FIG. 3, a length direction of the battery cell 102 is a first direction X, a width direction of the battery cell 102 is a second direction Y, and a height direction of the battery cell 102 is a third direction Z, where every two of the first direction X, the second direction Y, and the third direction Z are perpendicular to each other.

In some embodiments of the present application, with reference to FIG. 3 to FIG. 6, the battery cell 102 includes: a housing 1 and an electrode post 2, where the electrode post 2 is arranged on the housing 1, and an accommodating cavity 11 is formed inside the housing 1. For example, the battery cell 102 includes a battery cell assembly 7, the battery cell assembly 7 may include an active substance coated portion 71 and a conductive portion 72 connected to the active substance coated portion 71, the active substance coated portion 71 is accommodated in the accommodating cavity 11, and the conductive portion 72 is welded to the electrode post 2, so that the conductive portion 72 is electrically connected between the active substance coated portion 71 and the electrode post 2.

Figure 5:
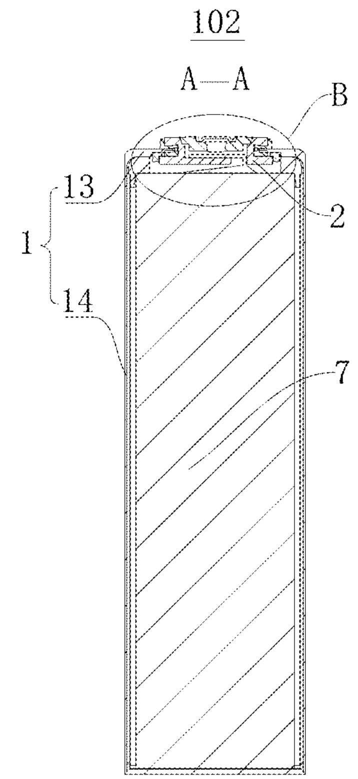
FIG. 5 is a cross-sectional view along a line A-A in FIG. 4.
Figure 6:
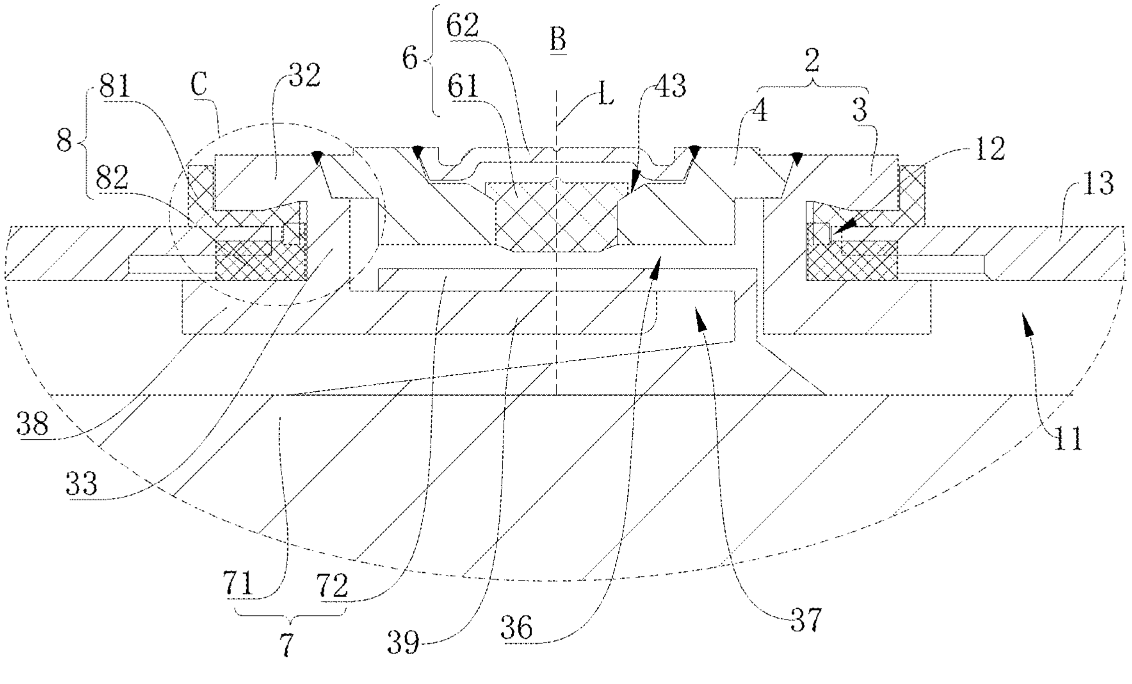
FIG. 6 is a partial enlarged view of a circle B in FIG. 5.

With reference to FIG. 5 and FIG. 6, the housing 1 includes a first housing wall 13, the first housing wall 13 is provided with a mounting hole 12, and the electrode post 2 passes through the mounting hole 12 to be mounted on the first housing wall 13. The electrode post 2 includes a pass-through portion 33 and a first extending portion 32. The pass-through portion 33 passes through the mounting hole 12, that is, at least a part of the pass-through portion 33 is located in the mounting hole 12. In addition, using an axial direction of the mounting hole 12 as a projection direction and a plane perpendicular to the axial direction of the mounting hole 12 as a projection plane, a projection of the pass-through portion 33 on the projection plane falls within a range of a projection of the mounting hole 12 on the projection plane, so that the pass-through portion 33 passes through the mounting hole 12. A type of the electrode post 2 is not limited, which may be a negative electrode post or may be a positive electrode post.

With reference to FIG. 5 and FIG. 6, the first extending portion 32 is connected to the pass-through portion 33 and extends, relative to the pass-through portion 33, toward a direction away from a central axis L of the mounting hole 12, where the first extending portion 32 extends to an outer side of an outer surface or an inner side of an inner surface of the first housing wall 13. Two side surfaces in a wall thickness direction of the first housing wall 13 are respectively the outer surface and the inner surface, the inner surface is a side surface of the first housing wall 13 facing the accommodating cavity 11, the outer surface is a side surface of the first housing wall 13 away from the accommodating cavity 11, a side of the outer surface away from the accommodating cavity 11 is the outer side of the outer surface, and a side of the inner surface facing the accommodating cavity 11 is the inner side of the inner surface. "The first extending portion 32 extends to an outer side of an outer surface or an inner side of an inner surface of the first housing wall 13" means that: at least a part of the first extending portion 32 faces the first housing wall 13, using the axial direction of the mounting hole 12 as a projection direction and using a plane perpendicular to the axial direction of the mounting hole 12 as a projection plane, a projection of the first extending portion 32 on the projection plane and a projection of the first housing wall 13 on the projection plane has an intersection region, and a part of the first extending portion 32 corresponding to the intersection region faces the first housing wall 13.

With reference to FIG. 5 and FIG. 6, the battery cell 102 further includes an insulating sealing structure 8 fitted between the first housing wall 13 and the electrode post 2. That is, at least a part of the insulating sealing structure 8 is clamped between the first housing wall 13 and the electrode post 2, so that the electrode post 2 indirectly fits the first housing wall 13 through the insulating sealing structure 8, thereby implementing insulation and sealing between the first housing wall 13 and the electrode post 2.

Figure 7:
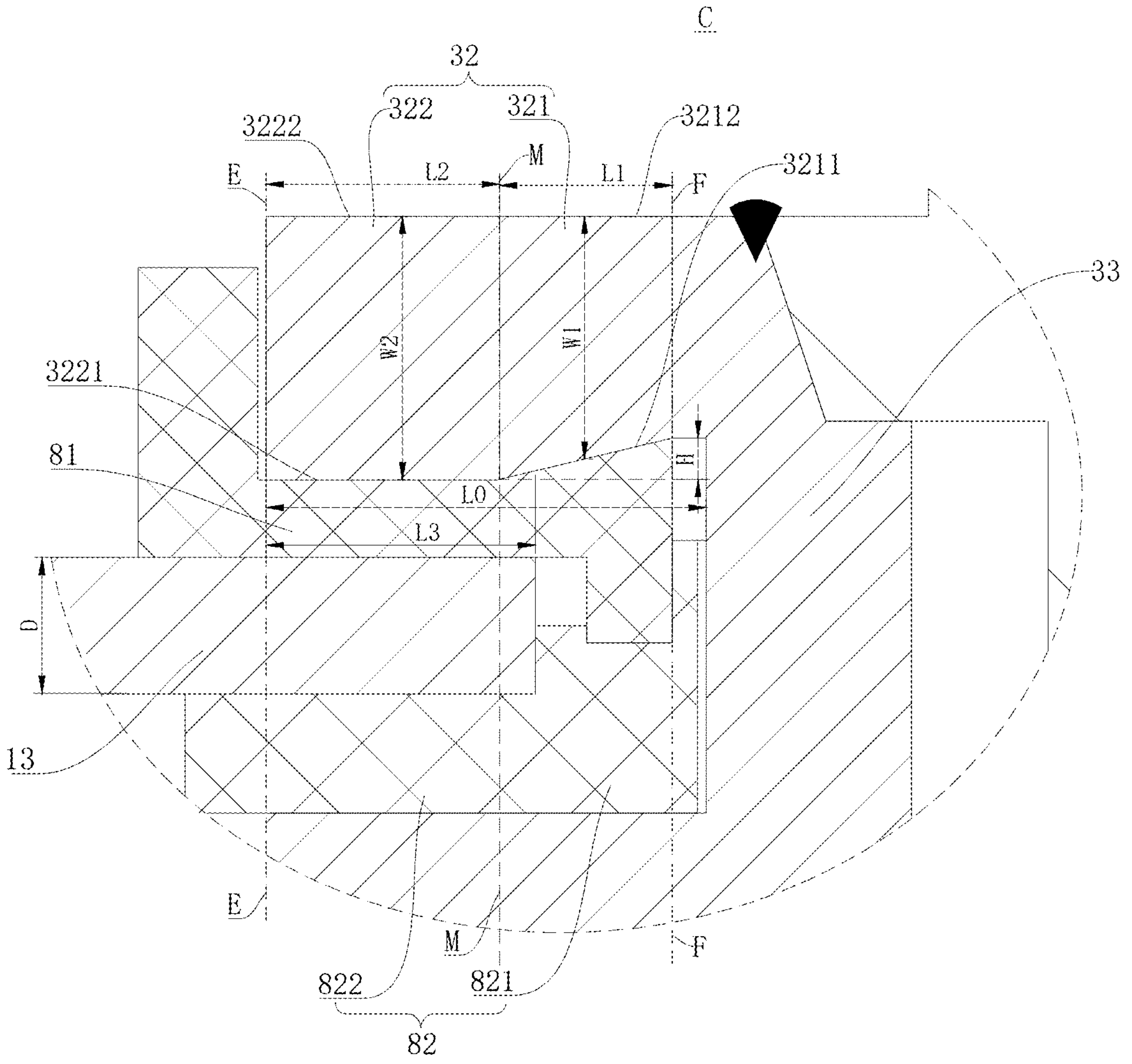
FIG. 7 is a partial enlarged view of a circle C in FIG. 6.

With reference to FIG. 6 and FIG. 7, the first extending portion 32 includes a first section portion 321 and a second section portion 322 that are sequentially arranged in the direction away from the central axis L of the mounting hole 12. That is, the second section portion 322 is arranged closer to an edge of the first extending portion 32 than the first section portion 321. For example, a part on a right side of an auxiliary line M shown in FIG. 7 is the first section portion 321, and a part on a left side of the auxiliary line M is the second section portion 322.

For example, with reference to FIG. 6, when the electrode post 2 includes an electrode post body 3 and an electrode post cover plate 4, when an edge of the electrode post cover plate 4 is welded to the first extending portion 32, under influence of welding, the first extending portion 32 easily tilts up, and the first extending portion 32 has a greater tilting degree at a position closer to an edge. Alternatively, when the electrode post 2 is an integral member and is welded to a bus component 103 arranged on the electrode post 2, under influence of welding, the first extending portion 32 also easily tilts up, and the first extending portion 32 also has a greater tilting degree at a position closer to an edge. When the first extending portion 32 has a great tilting amplitude at the edge, the edge of the first extending portion 32 cannot press against the insulating sealing structure 8, leading to an insufficient compression amount of the insulating sealing structure 8 and affecting a sealing effect between the housing 1 and the electrode post 2.

To alleviate the foregoing technical problem, in the embodiments of the present application, the second section portion 322 is set to press against the insulating sealing structure 8 to a greater degree than the first section portion 321. In this way, when the second section portion 322 on an outer side of the first section portion 321 tilts up under influence of welding, the second section portion 322 presses against the insulating sealing structure 8 to a greater degree than the first section portion 321, so that a problem that the insulating sealing structure 8 is not compressed enough since the second section portion tilts up 322 can be alleviated, thereby improving the sealing reliability between the electrode post 2 and the housing 1 and improving the reliability of the battery cell 102.

It should be noted that, there are many manners for implementing "the second section portion 322 presses against the insulating sealing structure 8 to a greater degree than the first section portion 321". For example, in some embodiments, by setting the second section portion 322 to have a greater compression amount on the insulating sealing structure 8 than the first section portion 321, to implement that the second section portion 322 presses against the insulating sealing structure 8 to a greater degree than the first section portion 321. For another example, the second section portion 322 is set to have greater mass per unit area than the first section portion 321, to implement that the second section portion 322 presses against the insulating sealing structure 8 to a greater degree than the first section portion 321, which are respectively listed below.

In some embodiments, it is set that a compression amount of the second section portion 322 on the insulating sealing structure 8 is greater than a compression amount of the first section portion 321 on the insulating sealing structure 8, that is, the second section portion 322 has a greater compression amount on the insulating sealing structure 8 than the first section portion 321, to implement that the second section portion 322 presses against the insulating sealing structure 8 to a greater degree than the first section portion 321. As shown in FIG. 6 and FIG. 7, the insulating sealing structure 8 includes a first part 821 arranged opposite to the first section portion 321 in the axial direction of the mounting hole 12 and a second part 822 arranged opposite to the second section portion 322 in the axial direction of the mounting hole 12. When a compression amount of the second part 822 is greater than a compression amount of the first part 821, it may be understood as that the second section portion 322 has a greater compression amount on the insulating sealing structure 8 than the first section portion 321.

The second section portion 322 has a greater compression amount on the insulating sealing structure 8 than the first section portion 321, so that when the compression amount of the first section portion 321 on a corresponding part (for example, the first part 821) of the insulating sealing structure 8 meets a requirement, the compression amount of the second section portion 322 on a corresponding part (for example, the second part 822) of the insulating sealing structure 8 has a compression margin, to present an effect that the second section portion 322 presses against the insulating sealing structure 8 to a greater degree than the first section portion 321. In this way, when the second section portion 322 tilts up, a compression amount loss caused by tilting of the second section portion 322 may be made up through the compression margin, so that the compression amount of the second section portion 322 that tilts up on the insulating sealing structure 8 still meets the compression amount requirement, thereby improving the sealing performance between the housing 1 and the electrode post 2, alleviating a leakage problem, and improving the reliability of the battery cell 102.

In some embodiments, the second section portion 322 protrudes, relative to the first section portion 321, toward a direction close to the first housing wall 13. That is, a side surface of the second section portion 322 close to the first housing wall 13 (that is, a second surface 3221 of the second section portion 322) is arranged closer to the first housing wall 13 than a side surface of the first section portion 321 close to the first housing wall 13 (that is, a first surface 3211 of the first section portion 321). Therefore, by causing the second section portion 322 to protrude toward the direction close to the first housing wall 13, it is easy to implement that the second section portion 322 has a greater compression amount on the insulating sealing structure 8 than the first section portion 321, so that a specific compression margin may be reserved. In this way, when the second section portion 322 tilts up, the compression amount loss caused by tilting of the second section portion 322 may be made up through the compression margin. Therefore, the compression amount of the second section portion 322 on the insulating sealing structure 8 is still enough to keep the sealing performance, thereby alleviating a problem of deterioration of the sealing performance between the housing 1 and the electrode post 2 caused by tilting of the second section portion 322.

Certainly, the present application is not limited thereto. For example, in other embodiments of the present application, the second surface 3221 of the second section portion 322 may alternatively be set to be flush with the first surface 3211 of the first section portion 321. In this case, the insulating sealing structure 8 may be set as: before assembly, a side surface of the second part 822 facing the second section portion 322 is set to protrude relative to a side surface of the first part 821 facing the first section portion 321, and after assembly, the side surface of the second part 822 facing the second section portion 322 is compressed to be flush with the side surface of the first part 821 facing the first section portion 321, indicating that the second part 822 is compressed to a greater degree than the first part 821. In this case, it may be also implemented that the second section portion 322 has a greater compression amount on the insulating sealing structure 8 than the first section portion 321. In this way, the second part 822 may also reserve a specific compression margin. When the second section portion 322 tilts up, the compression amount loss caused by tilting of the second section portion 322 may be made up through the compression margin. Therefore, the compression amount of the second section portion 322 on the insulating sealing structure 8 is still enough to keep the sealing performance, thereby alleviating a problem of deterioration of the sealing performance between the housing 1 and the electrode post 2 caused by tilting of the second section portion 322.

In some embodiments, as shown in FIG. 6 and FIG. 7, a thickness W2 of the second section portion 322 in the axial direction of the mounting hole 12 is greater than a thickness W1 of the first section portion 321 in the axial direction of the mounting hole 12. For example, when the thickness of the second section portion 322 is increased toward the direction close to the first housing wall 13, it may be implemented that the second section portion 322 protrudes, relative to the first section portion 321, toward the direction close to the first housing wall 13, making it easy to implement that the second section portion 322 has a greater compression amount on the insulating sealing structure 8 than the first section portion 321, to reserve a specific compression margin to make up for the compression amount loss caused by tilting of the second section portion 322, thereby alleviating a problem of deterioration of the sealing performance between the housing 1 and the electrode post 2 caused by tilting of the second section portion 322. For another example, when a thickness increasing direction of the second section portion 322 is not limited, if the first section portion 321 and the second section portion 322 are made of a consistent material or densities thereof are approximated, the second section portion 322 may have greater mass per unit area than the first section portion 321, which is conducive to increasing the tilting difficulty of the second section portion 322 and reducing a tilting amplitude of the second section portion 322, thereby alleviating a problem of poor sealing between the electrode post 2 and the housing 1 since the insulating sealing structure 8 cannot be pressed against due to a large tilting amplitude of the second section portion 322.

In some embodiments, as shown in FIG. 6 and FIG. 7, the side surface of the first section portion 321 close to the first housing wall 13 (that is, the first surface 3211 of the first section portion 321) is construed as obliquely extending, in the direction away from the central axis L of the mounting hole 12, toward the direction close to the first housing wall 13. Therefore, when the second section portion 322 protrudes, relative to the first section portion 321, toward the direction close to the first housing wall 13, a problem of a large step formed at a joint between the side surface of the first section portion 321 close to the first housing wall 13 (that is, the first surface 3211 of the first section portion 321) and the side surface of the second section portion 322 close to the first housing wall 13 (that is, the second surface 3221 of the second section portion 322) may be alleviated, to alleviate a problem of cracking caused by large deformation, thereby improving the structural reliability of the first extending portion 32.

In some embodiments, as shown in FIG. 6 and FIG. 7, the side surface of the second section portion 322 close to the first housing wall 13 (that is, the second surface 3221 of the second section portion 322) is construed as a plane parallel to the first housing wall 13, so that processing is facilitated, the compression amount on the insulating sealing structure 8 may be well controlled, and the problem of cracking of the insulating sealing structure 8 is alleviated.

In some embodiments, as shown in FIG. 6 and FIG. 7, when the first surface 3211 obliquely extends, in the direction away from the central axis L of the mounting hole 12, toward the direction close to the first housing wall 13, the first surface 3211 and the second surface 3221 are connected through a line or connected through a chamfer (for example, an inverted rounded corner or an inverted inclined corner). Therefore, no step is formed at the joint between the first surface 3211 and the second surface 3221, so that the problem of cracking of the first extending portion 32 at the joint may be alleviated, and a problem of cracking of the insulating sealing structure 8 at the corresponding joint caused by concentrated stress may be alleviated, thereby protecting the insulating sealing structure 8.

In some embodiments, when the second section portion 322 protrudes, relative to the first section portion 321, toward the direction close to the first housing wall 13, the second section portion 322 may be set to have a greater thickness W2 in the axial direction of the mounting hole 12 than the thickness W1 of the first section portion 321 in the axial direction of the mounting hole 12. When a thickness is not a fixed value, an average thickness may be used as the thickness.

Therefore, the thickness of the second section portion 322 is increased and it is defined that a thickness increasing direction of the second section portion 322 is a direction facing the first housing wall 13, so that the second section portion 322 may have a greater compression amount on the insulating sealing structure 8 to reserve a specific compression margin to make up for the compression amount loss caused by at least partial tilting of the second section portion 322, and the mass of the second section portion 322 may be increased to increase the tilting difficulty of the second section portion 322, to further reduce the tilting amplitude of the second section portion 322, so as to alleviate a problem of an insufficient compression amount of the insulating sealing structure 8 caused by tilting of the second section portion 322, thereby improving the sealing performance between the electrode post 2 and the housing 1.

For example, a side surface of the second section portion 322 away from the first housing wall 13 (that is, a fourth surface 3222 of the second section portion 322) is set to be flush with a side surface of the first section portion 321 away from the first housing wall 13 (that is, a third surface 3212 of the first section portion 321). In this way, a structure and processing of the first extending portion 32 may be simplified. For example, the first extending portion 32 processed in a riveted manner, the third surface 3212, and the fourth surface 3222 are flush with each other, making it easy to implement that the thickness of the second section portion 322 in the axial direction of the mounting hole 12 is greater than the thickness of the first section portion 321 in the axial direction of the mounting hole 12, and the second section portion 322 protrudes, relative to the first section portion 321, toward the direction close to the first housing wall 13.

Certainly, the present application is not limited thereto. For example, in other embodiments of the present application, the fourth surface 3222 of the second section portion 322 may be set to protrude out of the third surface 3212 of the first section portion 321 toward a direction away from the first housing wall 13, or the fourth surface 3222 of the second section portion 322 may be set to protrude out of the third surface 3212 of the first section portion 321 toward the direction close to the first housing wall 13, to implement "the thickness of the second section portion 322 in the axial direction of the mounting hole 12 is greater than the thickness of the first section portion 321 in the axial direction of the mounting hole 12, and the second section portion 322 protrudes, relative to the first section portion 321, toward the direction close to the first housing wall 13".

In some embodiments, as shown in FIG. 6 and FIG. 7, at least a half of an extension dimension of the first extending portion 32 in the direction away from the central axis L of the mounting hole 12 abuts against the first housing wall 13. The abutment refers to indirect contact through the insulating sealing structure 8. Specifically, using the axial direction of the mounting hole 12 as a projection direction and using a plane perpendicular to the axial direction of the mounting hole 12 as a projection plane, a projection of the first extending portion 32 on the projection plane and a projection of the first housing wall 13 on the projection plane has an intersection region, and a part of the first extending portion 32 corresponding to the intersection region abuts against the first housing wall 13.

For example, as shown in FIG. 7, a dimension of the part of the first extending portion 32 corresponding to the intersection region in a radial direction of the mounting hole 12 is L3, a dimension of the first extending portion 32 in the radial direction of the mounting hole 12 is L0, and $L3 \geq L0/2$ (as shown in FIG. 7). It should be noted that, a shape of the mounting hole 12 is not limited, for example, the mounting hole may be in a shape of a circle, a rectangle, an ellipse, or a track. For a non-circular mounting hole 12, the radial direction of the mounting hole 12 may include a width direction and a length direction of the mounting hole 12.

In brief, at least a half of a part of the first extending portion 32 in an extending direction abuts against the first housing wall 13, so that the first extending portion 32 may have a long dimension to abut against the first housing wall 13. Therefore, the insulating sealing structure 8 is effectively pressed against, and the sealing reliability is improved.

In some embodiments, as shown in FIG. 6 and FIG. 7, an extension dimension of the part of the first extending portion 32 abutting against the first housing wall 13 in the direction away from the central axis L of the mounting hole 12 is L3, and a wall thickness of the first housing wall 13 is D, where $0.5D \leq L3 \leq 2D$. Therefore, the dimension of the part of the first extending portion 32 abutting against the first housing wall 13 is approximated to the thickness of the first housing wall 13 or greater than the thickness of the first housing wall 13, so that the first extending portion 32 may have a long dimension to abut against the first housing wall 13. Therefore, the insulating sealing structure 8 is effectively pressed against, and the sealing reliability is improved.

In some embodiments, as shown in FIG. 6 and FIG. 7, an extension dimension of the first section portion 321 in the direction away from the central axis L of the mounting hole 12 is L1, an extension dimension of the second section portion 322 in the direction away from the central axis L of the mounting hole 12 is L2, and an inclination amplitude of the first surface 3211 in an axial direction of the mounting hole 12 is H, where L2 is less than or equal to twice H, that is, $L2 \leq 2H$. Therefore, deformation of a side surface of the first extending portion 32 facing the insulating sealing structure 8 is slow, so that the problem of cracking of the insulating sealing structure 8 may be well constrained.

In some embodiments, as shown in FIG. 6 and FIG. 7, $H \leq L1/2$, so that the inclination amplitude of the first surface 3211 is not excessively large. The first section portion 321 has a good structural reliability and may reliably connect the second section portion 322 and the pass-through portion 33, thereby improving the pressing reliability of the first extending portion 32 on the insulating sealing structure 8. In addition, an inclination angle of the first surface 3211 is not excessively large, so that local pressure on the insulating sealing structure 8 may be reduced, to alleviate the problem of cracking of the insulating sealing structure 8.

In some embodiments, as shown in FIG. 6 and FIG. 7, $L1 < L2$, so that a size of the second section portion 322 is greater than that of the first section portion 321, the second section portion 322 is less likely to tilt up, and the second section portion 322 can press against the insulating sealing structure 8 to a greater degree than the first section portion 321 more easily, which is conducive to increasing a pressing degree of the second section portion 322 on the insulating sealing structure 8, to better alleviate the problem of an insufficient compression amount of the insulating sealing structure 8 caused by tilting of the second section portion 322. In addition, the size of the second section portion 322 is greater than that of the first section portion 321, so that when the second section portion 322 presses against the insulating sealing structure 8 to a greater degree than the first section portion 321, pressure of the second section portion 322 on the insulating sealing structure 8 may be reduced, to alleviate the problem of cracking of the insulating sealing structure 8.

In some embodiments, as shown in FIG. 6 and FIG. 7, a dimension of the first extending portion 32 in the radial direction of the mounting hole 12 is L0, and a thickness of the second section portion 322 in the axial direction of the mounting hole 12 is W2, where $L0 \geq 1$ mm, and $W2 \geq 0.5$ mm. for example, L0 is 1 mm, 1.2 mm, 1.4 mm, 1.6 mm, 1.8 mm, or 2 mm, and W2 is 0.5 mm, 0.6 mm, 0.7 mm, 0.8 mm, 0.9 mm, or 1 mm. Therefore, the first extending portion 32 may have a large extension dimension to construct the second section portion 322, and the second section portion 322 has a large thickness dimension, so that the second section portion 322 may effectively abut against the first housing wall 13 to more effectively press against the insulating sealing structure 8, thereby improving the sealing reliability.

When the electrode post body 3 is welded to the electrode post cover plate 4, after a welding seam is shrunken through solidification, an edge of the first extending portion 32 easily tilts up to be deformed, leading to a decrease in a compression amount of an outer circle of the insulating sealing structure 8 and poor sealing, which is prone to leakage. In some embodiments of the present application, by limiting the size and the shape of the first extending portion 32, the first extending portion 32 is formed into a shape that is lengthened toward the direction away from the central axis L of the mounting hole 12 and whose edge protrudes toward the first housing wall 13 to increase the thickness, so that the compression amount of the edge of the first extending portion 32 on the insulating sealing structure 8 may be increased to reserve a specific compression margin. In this way, when the edge of the first extending portion 32 tilts up under influence of welding, the compression amount loss caused by tilting of the edge of the first extending portion 32 may be made up through the compression amount margin, so that the compression amount of the insulating sealing structure 8 is still enough, thereby resolving the problem of poor sealing caused by an insufficient compression amount of a sealing ring due to a large tilting amplitude of the edge of the first extending portion 32 that results from thermal shrinkage of the sealing seam after solidification.

In some embodiments, as shown in FIG. 6 and FIG. 7, the electrode post 2 further includes a second extending portion 38 that is connected to the pass-through portion 33 and extends, relative to the pass-through portion 33, toward the direction away from the central axis L of the mounting hole 12, and the second extending portion 38 and the first extending portion 32 respectively extend to an inner side and an outer side of the first housing wall 13. That is, when the first extending portion 32 extends to the outer side of the outer surface of the first housing wall 13, the second extending portion 38 extends to the inner side of the inner surface of the first housing wall 13; or when the first extending portion 32 extends to the inner side of the inner surface of the first housing wall 13, the second extending portion 38 extends to the outer side of the outer surface of the first housing wall 13. The insulating sealing structure 8 includes a first insulating sealing member 81 that is at least partially arranged between the first extending portion 32 and the first housing wall 13 and a second insulating sealing member 82 that is at least partially arranged between the second extending portion 38 and the first housing wall 13, where the first insulating sealing member 81 and the second insulating sealing member 82 are two parts, and material hardness of the first insulating sealing member 81 is greater than material hardness of the second insulating sealing member 82.

In this way, a pressing force applied by the first extending portion 32 to the first insulating sealing member 81 may be well transmitted to the second insulating sealing member 82, so that the second insulating sealing member 82 can be well compressed. Therefore, a compression amount of the first insulating sealing member 81 may be less than a compression amount of the second insulating sealing member 82, and both the first insulating sealing member 81 and the second insulating sealing member 82 may well play a sealing effect. In addition, it should be noted that, when the insulating sealing structure 8 includes the first insulating sealing member 81 and the second insulating sealing member 82, that the second section portion 322 has a greater compression amount on the insulating sealing structure 8 than the first section portion 321 may be understood as: the second section portion 322 has a greater compression amount on the second insulating sealing member 82 than the first section portion 321.

In some embodiments, as shown in FIG. 6 and FIG. 7, when the material hardness of the first insulating sealing member 81 is greater than the material hardness of the second insulating sealing member 82, a shape of a side surface of the first insulating sealing member 81 away from the first housing wall 13 is set to match a shape of a side surface of the first extending portion 32 facing the first housing wall 13, so that a contact area between the first insulating sealing member 81 and the first extending portion 32 may be increased, to reduce a problem of cracking of the first insulating sealing member 81 caused by local acting force concentration. In addition, when the second section portion 322 protrudes, relative to the first section portion 321, toward the direction close to the first housing wall 13, the first extending portion 32 and the first insulating sealing member 81 may form concave-convex matching through shaping matching to play a limiting function, which is conducive to alleviating problems of movement or loosening of the first insulating sealing member 81 in a vibration or impact process of the battery cell 102, so that the first insulating sealing member 81 may not be separated from a sealing fitting position, the arrangement stability of the first insulating sealing member 81 is improved, and the first insulating sealing member 81 plays a reliable insulating sealing effect.

In some embodiments of the present application, as shown in FIG. 6 and FIG. 7, the electrode post 2 includes an electrode post body 3 and an electrode post cover plate 4, the electrode post body 3 includes the first extending portion 32 and the second extending portion 38, the first extending portion 32 extends to the outer side of the outer surface of the first housing wall 13, the electrode post cover plate 4 covers an outer side of the electrode post body 3, and the electrode post body 3 is welded to the electrode post cover plate 4.

Therefore, the electrode post cover plate 4 covers the outer side of the electrode post body 3, so that the electrode post cover plate 4 is arranged close to the first extending portion 32 relative to the second extending portion 38, and heat generated due to welding the electrode post cover plate 4 to the electrode post body 3 is more conducted to the first insulating sealing member 81 relative to the second insulating sealing member 82. The material hardness of the first insulating sealing member 81 is greater than the material hardness of the second insulating sealing member 82, so that a heat resistance capability of the first insulating sealing member 81 is stronger than a heat resistance capability of the second insulating sealing member 82. For example, the first insulating sealing member 81 is a plastic member, and the second insulating sealing member 82 is a rubber member, so that when the electrode post cover plate 4 is welded to the electrode post body 3, thermal influence caused to the second insulating sealing member 82 may be reduced as much as possible, thereby improving the sealing reliability between the first housing wall 13 and the electrode post 2.

Figure 8:
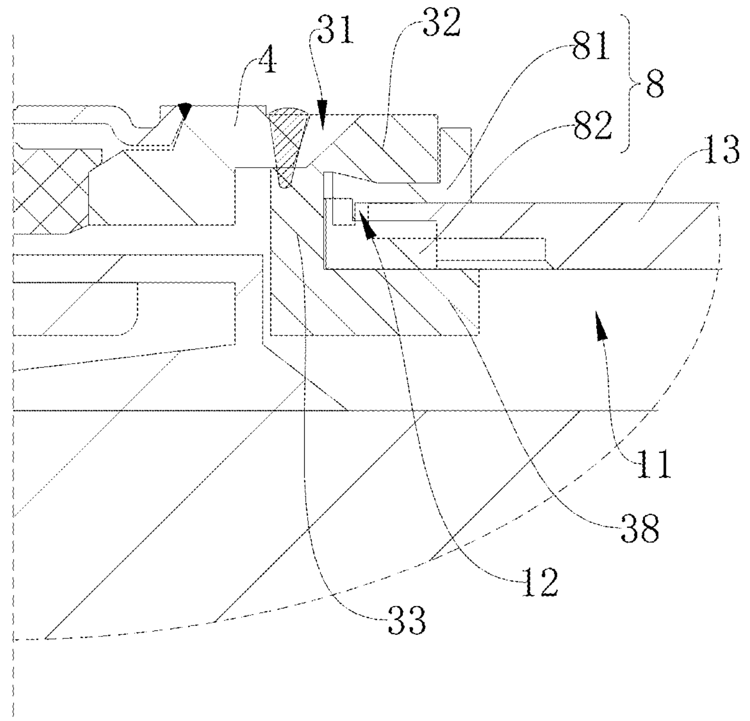
FIG. 8 is a partial cross-sectional view of a battery cell according to some embodiments of the present application.

In some embodiments of the present application, as shown in FIG. 8, the first extending portion 32 protrudes from the pass-through portion 33 toward an outer side of the first housing wall 13, to define a depressed groove 31 between the first extending portion 32 and the pass-through portion 33, an edge of the electrode post cover plate 4 is arranged in the depressed groove 31 and is welded to the pass-through portion 33 in a pass-through manner, and a welding structure formed through welding is separated from the first extending portion 32.

Therefore, shrinkage stress generated due to solidification of a molten pool formed by the welding may be separated by the foregoing gap, and the shrinkage stress is hardly or less transmitted to the first extending portion 32, so that a tilting problem of the first extending portion 32 may be alleviated, and the first extending portion 32 may press against the insulating sealing structure 8, thereby improving an insulating sealing effect. In addition, the edge of the electrode post cover plate 4 is arranged in the depressed groove 31 and is welded to the pass-through portion 33 in a pass-through manner rather than being butt welded to the first extending portion 32, so that there is no need to ensure a small assembly gap between the edge of the electrode post cover plate 4 and the first extending portion 32 to meet a butt welding requirement, and the gap between the edge of the electrode post cover plate 4 and the first extending portion 32 may be large. Therefore, the compatibility of the electrode post body 3 is improved, which is conducive to reducing the processing precision of the electrode post cover plate 4 and the electrode post body 3.

Figure 9:
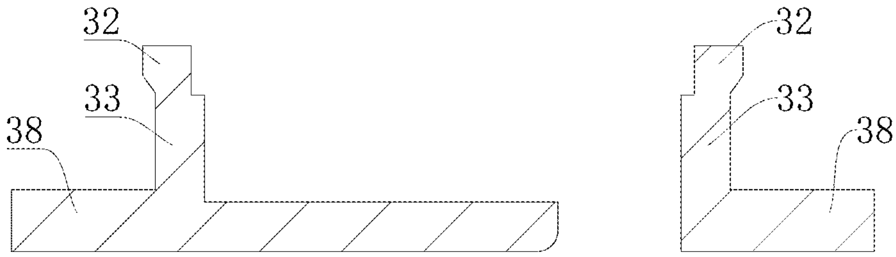
FIG. 9 is a state diagram of an electrode post before riveting according to some embodiments of the present application.
Figure 10:
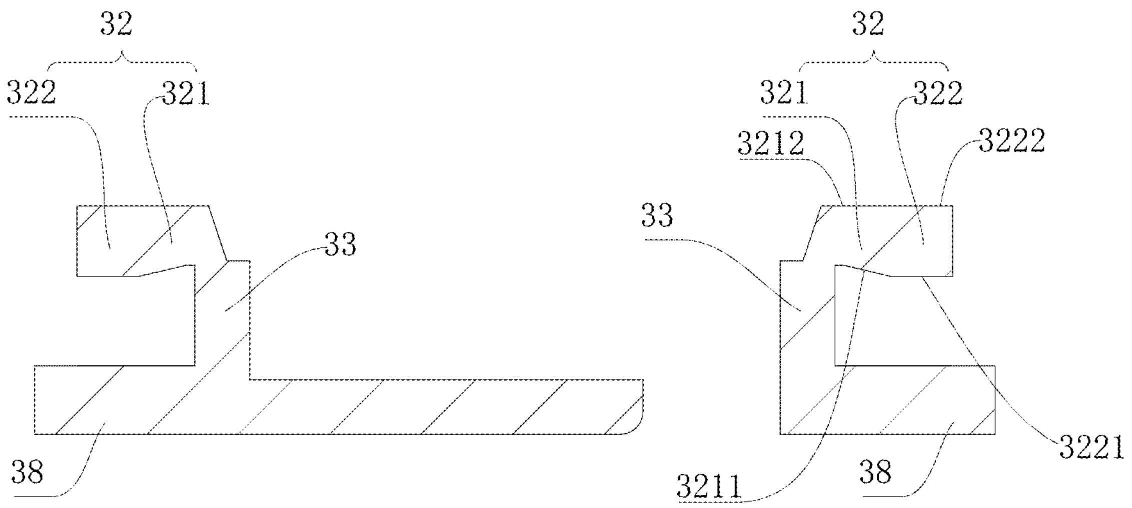
FIG. 10 is a state diagram of an electrode post after riveting according to some embodiments of the present application.

In some embodiments of the present application, as shown in FIG. 9 and FIG. 10, the electrode post 2 forms the first extending portion 32 through flanging riveting. For example, FIG. 9 shows a state of the electrode post 2 before riveting, and FIG. 10 shows a state of the electrode post 2 after riveting. Specifically, when the electrode post 2 is assembled to the mounting hole 12 through the pass-through portion 33, the first extending portion 32 is manufactured by using a flanging riveting process. Therefore, processing of the electrode post 2 is convenient, and the connection reliability of the first extending portion 32 and the pass-through portion 33 may be improved, thereby improving the assembly reliability of the electrode post 2 and the first housing wall 13.

For example, before the first extending portion 32 is riveted, the first extending portion 32 may be set as a protruding structure at an outer end of the outer surface, after the first extending portion 32 is flanged and riveted, an obtained third surface 3212 of the first section portion 321 is flush with an obtained fourth surface 3222 of the second section portion 322, and the second surface 3221 of the second section portion 322 protrudes, relative to the first surface 3211 of the first section portion 321, toward the first housing wall 13. In this way, during flanging riveting, the second section portion 322 has a greater compression amount on the insulating sealing structure 8 than the first section portion 321, so that the insulating sealing structure 8 obtains a compression margin at the corresponding second section portion 322, alleviating a problem of poor sealing caused by tilting of the second section portion 322.

Certainly, the present application is not limited thereto. For example, in other embodiments of the present application, the electrode post 2 may alternatively be formed by two parts through welding. For example, the two parts are respectively assembled to the mounting hole 12, and the two parts are then welded together. It may be understood that, when the electrode post 2 is assembled to the first housing wall 13 in another manner other than riveting, the insulating sealing structure 8 may also be squeezed.

In some embodiments of the present application, it may also be set that mass per unit area of the second section portion 322 is greater than mass per unit area of the first section portion 321. That is, the second section portion 322 has greater mass per unit area than the first section portion 321, to implement that the second section portion 322 presses against the insulating sealing structure 8 to a greater degree than the first section portion 321. The second section portion 322 has greater mass per unit area than the first section portion 321, so that the tilting difficulty of the second section portion 322 than the first section portion 321 may be increased, to present an effect that the second section portion 322 presses against the insulating sealing structure 8 to a greater degree than the first section portion 321. In this way, the tilting amplitude of the second section portion 322 may be reduced to a specific degree, so that a problem of poor sealing between the electrode post 2 and the housing 1 since the insulating sealing structure 8 cannot be pressed against due to a large tilting amplitude of the second section portion 322 may be alleviated, thereby improving the sealing performance between the housing 1 and the electrode post 2, alleviating a leakage problem, and improving the reliability of the battery cell 102.

It should be noted that, when the second section portion 322 has greater mass per unit area than the first section portion 321, the second section portion 322 does not necessarily have a greater compression amount on the insulating sealing structure 8 than the first section portion 321. When it is set that the second section portion 322 has a greater compression amount on the insulating sealing structure 8 than the first section portion 321 and the second section portion 322 has greater mass per unit area than the first section portion 321, that the second section portion 322 presses against the insulating sealing structure 8 to a greater degree than the first section portion 321 may be implemented more effectively. Therefore, by setting the second section portion 322 to have greater mass per unit area than the first section portion 321, it is easy to implement that the second section portion 322 has a greater compression amount on the insulating sealing structure 8 than the first section portion 321, so that not only the compression margin may be used to make up for the compression amount loss caused by tilting of the second section portion 322, but also the tilting amplitude of the second section portion 322 may be reduced, thereby more effectively improving the sealing performance between the housing 1 and the electrode post 2, alleviating a leakage problem, and improving the reliability of the battery cell 102.

In some embodiments, a thickness of the second section portion 322 is greater than a thickness of the first section portion 321; and/or a density of the second section portion 322 is greater than a density of the first section portion 321. That is, the second section portion 322 is greater than the first section portion 321 in at least one of a thickness and a density. Namely, the density of the second section portion 322 is greater than the density of the first section portion 321, or the thickness of the second section portion 322 is greater than the thickness of the first section portion 321, or both the density and the thickness of the second section portion 322 are respectively greater than the density and the thickness of the first section portion 321. The thickness is a dimension in the axial direction of the mounting hole 12, and when the thickness is not a fixed value, the thickness is an average thickness.

Therefore, by setting the second section portion 322 to be greater than the first section portion 321 in at least one of a thickness and a density, it is easy to implement that the second section portion 322 has greater mass per unit area than the first section portion 321, so that the structural complexity of the first extending portion 32 may be reduced, and the design and processing difficulty of the first extending portion 32 may be reduced.

Certainly, the present application is not limited thereto. For example, in other embodiments of the present application, the second section portion 322 or the first section portion 321 may alternatively set to be a composite structure formed by a plurality of parts, or some parts may be dug out from the first section portion 321, to cause the second section portion 322 to have greater mass per unit area than the first section portion 321.

In some embodiments, the first section portion 321 and the second section portion 322 are made of a same material, the side surface of the second section portion 322 away from the first housing wall 13 is flush with the side surface of the first section portion 321 away from the first housing wall 13, and the second section portion 322 protrudes, relative to the first section portion 321, toward the direction close to the first housing wall 13. Therefore, by causing the second section portion to protrude toward the direction close to the first housing wall 13 to increase the thickness of the second section portion 322, it is easy to implement that the second section portion 322 has greater mass per unit area than the first section portion 321, so that not only a compression amount of the second section portion 322 to a corresponding position of the insulating sealing structure 8 may be increased, and the tilting difficulty of the second section portion 322 may be increased, thereby reducing the tilting amplitude of the second section portion 322, and alleviating the problem of poor sealing between the electrode post 2 and the housing 1 since the insulating sealing structure 8 cannot be pressed against due to a large tilting amplitude of the second section portion 322.

In some embodiments of the present application, as shown in FIG. 5 and FIG. 6, the battery cell 102 is provided with an accommodating cavity 11 on an inner side of the first housing wall 13, the electrode post 2 includes the electrode post body 3, an accommodating groove 36 opened toward a direction away from the accommodating cavity 11 is formed on the electrode post body 3, a communication hole 37 is provided on the electrode post body 3, and the communication hole 37 penetrates a side groove wall of the accommodating groove 36 close to the accommodating cavity 11 and communicates the accommodating cavity 11 with the accommodating groove 36. For example, when the pass-through portion 33 is annular, the accommodating groove 36 is located in an inner ring region of the pass-through portion 33. For example, the pass-through portion 33 and a support portion 39 located in the inner ring region of the pass-through portion 33 may jointly define the accommodating groove 36.

Therefore, when an electrolyte is injected into the battery cell 102, the electrolyte may be injected into the accommodating groove 36 and flows toward the accommodating cavity 11 through the communication hole 37, where the accommodating groove 36 may buffer the electrolyte to alleviate a problem of splashing or overflowing of the electrolyte. In addition, a side wall of the accommodating groove 36 (that is, a groove wall extending from a groove opening of the accommodating groove 36 toward the accommodating cavity 11) may prevent the electrolyte from splashing to a specific degree, thereby reducing pollution caused by the electrolyte to the outside and facilitating fast liquid injection. In addition, there is no need to separately provide a liquid injection channel on the housing 1, so that there is no need to perform special processing on the housing 1, which is conducive to reducing the structural complexity and the processing difficulty of the housing 1.

In some embodiments of the present application, as shown in FIG. 5 and FIG. 6, the battery cell 102 includes a battery cell assembly 7, the battery cell assembly 7 includes an active substance coated portion 71 accommodated in the accommodating cavity 11 and a conductive portion 72 connected to the active substance coated portion 71, and the conductive portion 72 passes through the communication hole 37 to be at least partially accommodated in the accommodating groove 36. It should be noted that, there may be one or a plurality of communication holes 37, and the conductive portion 72 may pass through at least one communication hole 37. For example, the electrolyte can pass through the at least one communication hole 37. For example, at least one communication hole 37 is empty (that is, the conductive portion 72 does not pass through the communication hole), so that the electrolyte can pass through without being blocked by the conductive portion 72. For another example, the electrolyte can still pass through at least one communication hole 37 after the conductive portion 72 passes through the communication hole.

Therefore, at least a part of the conductive portion 72 is accommodated in the accommodating groove 36, so that the at least a part of the conductive portion 72 occupies a space in the accommodating groove 36, space occupation of the conductive portion 72 in the accommodating cavity 11 may be reduced, and a space in the accommodating cavity 11 is saved to accommodate the active substance coated portion 71 with a greater volume, which is conducive to improving an energy density of the battery cell 102 or is conducive to reducing a size of the battery cell 102 while the energy density of the battery cell 102 remains unchanged.

It may be understood that, the active substance coated portion 71 may include a current collector coated with an active substance layer, and the conductive portion 72 may include only a tab portion or may include a tab portion and an adapting piece electrically connected to the tab portion, which is not limited herein.

In some embodiments, the conductive portion 72 is welded to the electrode post body 3 to form an electrical connection, so that electrode output of the battery cell assembly 7 at the electrode post body 3 is implemented. For example, as shown in FIG. 6, the conductive portion 72 is welded to the side groove wall of the accommodating groove 36 close to the accommodating cavity 11, so that the fitting compactness may be improved, and operations for welding the conductive portion to the side groove wall are facilitated. Certainly, the present application is not limited thereto. In other embodiments, the conductive portion 72 may alternatively be set to be welded to the electrode post cover plate 4 to form an electrical connection, which is not limited herein.

In some embodiments of the present application, as shown in FIG. 5 and FIG. 6, the electrode post 2 includes the electrode post cover plate 4 covering the electrode post body 3, a liquid injection hole 43 that is capable of being in communication with the accommodating groove 36 is formed on the electrode post cover plate 4, and the battery cell 102 further includes a sealing structure 6 configured to seal the liquid injection hole 43.

In this way, when an electrolyte needs to be injected into the battery cell 102, the sealing structure 6 is not first mounted at the liquid injection hole 43, or the sealing structure 6 presents a state of opening the liquid injection hole 43. In this case, the electrolyte may be injected into the accommodating groove 36 through the liquid injection hole 43. In addition, after injection, the sealing structure 6 may be mounted at the liquid injection hole 43, or the sealing structure 6 may be switched to a state of closing the liquid injection hole 43, to seal and close the liquid injection hole 43, so as to prevent the electrolyte from overflowing, and prevent external foreign objects from entering the accommodating cavity 11 through the liquid injection hole 43, thereby improving the reliability of the battery cell 102.

Therefore, the liquid injection hole 43 is processed on the electrode post cover plate 4, so that an opened hole is small and a position is close to the outside, making it easy to reliably seal a liquid injection entrance through the sealing structure 6, thereby improving the operating reliability of the battery cell 102 and implementing flexible and diversified design of the sealing structure 6.

In some embodiments, as shown in FIG. 6, the electrode post cover plate 4 does not include a part stopped at an outer side of the sealing structure 6 (that is, a side away from the accommodating cavity 11), so that the sealing structure 6 is adapted to be mounted to the electrode post cover plate 4 from an outer side of the electrode post cover plate 4 (that is, a side away from the accommodating cavity 11). In this way, the sealing structure 6 is set to be mounted to the electrode post cover plate 4 from the outer side of the electrode post cover plate 4 to seal the liquid injection hole 43, and the sealing structure 6 is mounted after liquid injection, so that the sealing performance of the liquid injection hole 43 may be ensured, and a mounting position is close to the outer side, thereby facilitating fast assembly of the sealing structure 6. In addition, mounting of the sealing structure 6 does not cause adverse effects on a connection between the electrode post body 3 and the electrode post cover plate 4, thereby ensuring the connection reliability between the electrode post cover plate 4 and the electrode post body 3.

The sealing structure 6 may be in a detachable form or may be in a non-detachable fixed form. For example, when the sealing structure 6 is in the detachable form, maintenance of the liquid injection hole 43 is facilitated. For example, when an electrolyte needs to be supplemented, the sealing structure 6 may be removed to open the liquid injection hole 43, to supplement and inject the electrolyte into the accommodating cavity 11 through the liquid injection hole 43. Then, the sealing structure 6 is then assembled. For example, the sealing structure 6 may be detachably connected to the electrode post cover plate 4 in a screwed or rotary manner, thereby facilitating disassembly and assembly.

For example, when the sealing structure 6 is in a non-detachable fixed form, the sealing structure 6 may be fixed to the electrode post cover plate 4 in a welding or riveting manner, thereby improving the sealing reliability of the sealing structure 6 on the liquid injection hole 43. For example, the liquid injection hole 43 may include a plurality of sections, and the sealing structure 6 may include a first sealing member 61 that is in interference fit with the liquid injection hole 43 and a second sealing member 62 that covers the outside of the first sealing member 61 and is welded to the electrode post cover plate 4.

Alternatively, in some embodiments, the second sealing member 62 may be set to be detachably connected to the electrode post cover plate 4 in a rotary manner, to limit the first sealing member 61 at a position that is in interference fit with the liquid injection hole 43.

In some embodiments of the present application, as shown in FIG. 6, at least a part of the sealing structure 6 is embedded in the liquid injection hole 43. That is, the sealing structure 6 may be totally embedded in the liquid injection hole 43, or only a part of the sealing structure 6 is embedded in the liquid injection hole 43. Therefore, a space in the liquid injection hole 43 may be fully utilized, to improve the sealing reliability of the sealing structure 6 on the liquid injection hole 43, and a height of the sealing structure 6 protruding from the liquid injection hole 43 may be reduced, to reduce occupation of the sealing structure 6 to a space outside the electrode post cover plate 4, which is conducive to reducing interference and influence to the bus component 103, increasing a connection area between the bus component 103 and the electrode post cover plate 4, and improving liquid passing efficiency.

In some embodiments of the present application, the first housing wall 13 is an integrally formed cover plate, or as shown in FIG. 5, the housing 1 further includes a second housing wall 14, where the first housing wall 13 is integrally formed with the at least one second housing wall 14, and the second housing wall 14 extends toward a side of the first housing wall 13 in a thickness direction. Therefore, flexible design of a structure position of the electrode post 2 may be implemented, thereby increasing an application range of the battery cell 102 according to the embodiments of the present application.

It should be noted that, the second housing wall 14 may extend out from an edge of the first housing wall 13, when the first housing wall 13 is rectangular, the second housing wall 14 may extend out of at least one edge of four edges of the first housing wall 13. For example, the second housing wall 14 extends out of only one edge of the first housing wall 13. Alternatively, the second housing wall 14 may respectively extend out of two edges of the first housing wall 13, or the second housing wall 14 may respectively extend out of three edges of the first housing wall 13, or the second housing wall 14 may extend out of the four edges of the first housing wall 13. For example, when the housing 1 is a rectangular housing, any wall surface of the rectangular housing may be used as the first housing wall 13.

For example, the housing 1 may include a housing body and a cover plate, where the housing body defines a space being open on one side, and the cover plate covers an open side of the housing body, to form the accommodating cavity 11 between the housing body and the cover plate. In this case, a side surface of the housing body opposite to the cover plate is the first housing wall 13, a wall surface of the housing body connected between the first housing wall 13 and the cover plate is the second housing wall 14; or a side surface of the housing body opposite to the cover plate is the second housing wall 14, and a wall surface of the housing body connected between the second housing wall 14 and the cover plate is the first housing wall 13; or the cover plate is the first housing wall 13.

According to an embodiment of a second aspect of the present application, an embodiment of the present application further provides a battery 100, including the battery cell 102 according to any one of the foregoing solutions. It should be noted that the battery 100 according to the embodiments of the present application may or may not include a box. Therefore, the reliability of the battery cell 102 according to the embodiments of the present application is improved, so that the performance of the battery 100 may be improved.

Figure 11:
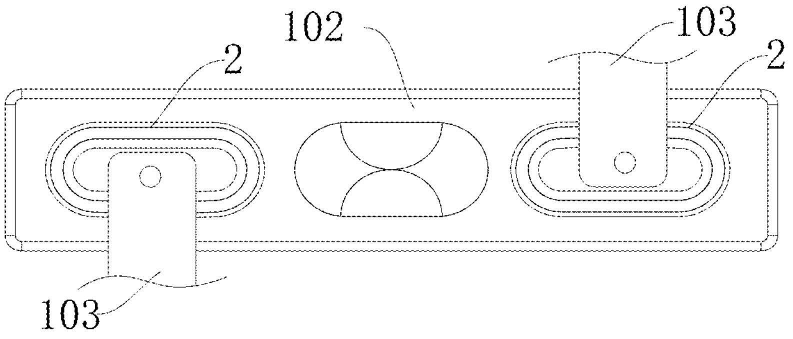
FIG. 11 is a schematic diagram of cooperation between a battery cell and a bus component according to some embodiments of the present application.

For example, as shown in FIG. 11, the battery 100 may further include a bus component 103, and there are a plurality of battery cells 102 and at least two battery cells are electrically connected through the bus component 103. Therefore, the plurality of battery cells 102 may be connected in series and/or in parallel. For example, when the plurality of battery cells 102 are connected in series, a positive electrode post cover plate 4 of one battery cell 102 is connected to a negative electrode post cover plate 4 of a next battery cell 102 through a bus component 103, and a negative electrode post cover plate 4 of the battery cell 102 is connected to a positive electrode post cover plate 4 of a previous battery cell 102 through another bus component 103.

According to an embodiment of a third aspect of the present application, an embodiment of the present application further provides a power consuming device, including the battery 100 according to any one of the foregoing solutions, where the battery 100 is configured to provide electric energy for the power consuming device. The power consuming device may be any one of the foregoing devices or systems in which the battery 100 is used. The performance of the battery 100 is improved, so that the operating power consuming performance of the power consuming device may be improved.

The following describes a battery cell 102 according to a specific embodiment of the present application.

The battery cell 102 includes a housing 1, an electrode post 2, and an insulating sealing structure 8. The housing 1 includes a first housing wall 13, and the first housing wall 13 is provided with a mounting hole 12. The electrode post 2 includes an electrode post body 3 and an electrode post cover plate 4, the electrode post cover plate 4 covers an outer side of the electrode post body 3, and the electrode post body 3 includes a pass-through portion 33 passing through the mounting hole 12, a first extending portion 32 that is connected to the pass-through portion 33 and extends, relative to the pass-through portion 33, toward a direction away from a central axis L of the mounting hole 12, and a second extending portion 38 that is connected to the pass-through portion 33 and extends, relative to the pass-through portion 33, toward the direction away from the central axis L of the mounting hole 12. The first extending portion 32 extends to an outer side of an outer surface of the first housing wall 13, the second extending portion 38 extends to an inner side of an inner surface of the first housing wall 13, and the electrode post 2 forms the first extending portion 32 through flanging riveting.

The first extending portion 32 includes a first section portion 321 and a second section portion 322 that are sequentially arranged in the direction away from the central axis L of the mounting hole 12, a thickness of the second section portion 322 in an axial direction of the mounting hole 12 is greater than a thickness of the first section portion 321 in the axial direction of the mounting hole 12, a side surface of the first section portion 321 close to the first housing wall 13 is a first surface 3211, and a side surface of the second section portion 322 close to the first housing wall 13 is a second surface 3221. The first surface 3211 obliquely extends, in the direction away from the central axis L of the mounting hole 12, toward a direction close to the first housing wall 13, the second surface 3221 is parallel to the first housing wall 13, and the first surface 3211 is connected to the second surface 3221 through a line, so that the second surface 3221 protrudes, relative to the first surface 3211, toward the direction close to the first housing wall 13. For example, before the electrode post 2 is riveted, a part corresponding to the first extending portion 32 may be set to be in a shape of a trapezoid, so that a form that the second section portion 322 protrudes, relative to the first section portion 321, toward the direction close to the first housing wall 13 may be obtained after riveting.

The pass-through portion 33 and the first extending portion 32 form a first electrode post portion, the insulating sealing structure 8 includes a first insulating sealing member 81 fitted between the first electrode post portion and the first housing wall 13, the pass-through portion 33 and the second extending portion 38 form a second electrode post portion, and the insulating sealing structure 8 includes a second insulating sealing member 82 fitted between the second electrode post portion and the first housing wall 13, where the second insulating sealing member 82 and the first insulating sealing member 81 are separately arranged. The first insulating sealing member 81 is a plastic member, the second insulating sealing member 82 is a rubber member, and material hardness of the first insulating sealing member 81 is greater than material hardness of the second insulating sealing member 82. A shape of a side surface of the first insulating sealing member 81 away from the first housing wall 13 matches a shape of a side surface of the first extending portion 32 facing the first housing wall 13. The second insulating sealing member 82 includes a first part 821 that is arranged opposite to the first section portion 321 in the axial direction of the mounting hole 12 and a second part 822 that is arranged opposite to the second section portion 322 in the axial direction of the mounting hole 12.

During assembly, the first insulating sealing member 81, the second insulating sealing member 82, and the electrode post body 3 may be first mounted at the mounting hole 12 of the first housing wall 13, and the first extending portion 32 is then processed through a riveting process. In this case, the first extending portion 32 applies an acting force to the first insulating sealing member 81, the first insulating sealing member 81 applies the acting force to the second insulating sealing member 82 through the first housing wall 13, and the second section portion 322 protrudes, relative to the first section portion 321, toward the direction close to the first housing wall 13, so that a compression amount of the second part 822 is greater than a compression amount of the first part 821.

Therefore, the insulating sealing structure 8 may reserve a specific compression margin at a position corresponding to the second section portion 322. When the second section portion 322 tilts up due to shrinkage deformation caused by welding the electrode post cover plate 4 to the electrode post body 3, the insulating sealing structure 8 has the compression margin at the position corresponding to the second section portion 322, so that a compression amount loss caused by tilting of the second section portion 322 may be made up through the compression margin, and a compression amount of the insulating sealing structure 8 at the position corresponding to the second section portion 322 is still enough, thereby improving the sealing reliability and resolving a problem of leakage caused by a sealing failure that results from an excessively large compression amount loss. In addition, the shape of the side surface of the first insulating sealing member 81 away from the first housing wall 13 matches the shape of the side surface of the first extending portion 32 facing the first housing wall 13, which is conducive to reducing a problem of loosening of the first insulating sealing member 81 in a vibration or impact environment, thereby improving the arrangement stability and the insulating sealing reliability of the first insulating sealing member 81.

It should be noted that, the embodiments in the present application and features in the embodiments may be mutually combined in a case that no conflict occurs.

The foregoing merely describes preferred embodiments of the present application and is not intended to limit the present application. For a person skilled in the art, the present application may have various modifications and changes. Any modification, equivalent replacement, or improvement made without departing from the spirit and principle of the present application shall fall within the protection scope of the present application.

What is claimed is:

1. A battery cell, comprising:

a first housing wall, provided with a mounting hole;

an electrode post, comprising a pass-through portion passing through the mounting hole and a first extending portion that is connected to the pass-through portion and extends, relative to the pass-through portion, toward a direction away from a central axis of the mounting hole, wherein the first extending portion extends to an outer side of an outer surface or an inner side of an inner surface of the first housing wall; and an insulating sealing structure, fitted between the electrode post and the first housing wall, wherein the first extending portion comprises a first section portion and a second section portion that are sequentially arranged in the direction away from the central axis of the mounting hole, and the second section portion presses against the insulating sealing structure to a greater degree than the first section portion, a side surface of the first section portion close to the first housing wall is a first surface, a side surface of the second section portion close to the first housing wall is a second surface, the second surface protrudes, relative to the first surface, toward a direction close to the first housing wall, the first surface obliquely extends, in the direction from the central axis of the mounting hole to the first housing wall, with a downward inclination towards the first housing wall.

2. The battery cell according to claim 1, wherein a compression amount of the second section portion on the insulating sealing structure is greater than a compression amount of the first section portion on the insulating sealing structure.

3. The battery cell according to claim 1, wherein the first surface and the second surface are connected through a line or connected through a chamfer.

4. The battery cell according to claim 1, wherein a thickness of the second section portion in an axial direction of the mounting hole is greater than a thickness of the first section portion in the axial direction of the mounting hole.

5. The battery cell according to claim 4, wherein a side surface of the second section portion away from the first housing wall is flush with a side surface of the first section portion away from the first housing wall.

6. The battery cell according to claim 1, wherein at least a half of an extension dimension of the first extending portion in the direction away from the central axis of the mounting hole abuts against the first housing wall.

7. The battery cell according to claim 2, wherein the electrode post further comprises a second extending portion that is connected to the pass-through portion and extends, relative to the pass-through portion, toward the direction away from the central axis of the mounting hole, the second extending portion and the first extending portion respectively extend to an inner side and an outer side of the first housing wall, the insulating sealing structure comprises a first insulating sealing member that is at least partially arranged between the first extending portion and the first housing wall and a second insulating sealing member that is at least partially arranged between the second extending portion and the first housing wall, and material hardness of the first insulating sealing member is greater than material hardness of the second insulating sealing member.

8. The battery cell according to claim 7, wherein a shape of a side surface of the first insulating sealing member away from the first housing wall matches a shape of a side surface of the first extending portion facing the first housing wall.

9. The battery cell according to claim 7, wherein the electrode post comprises an electrode post body and an electrode post cover plate, the electrode post body comprises the first extending portion and the second extending portion, the first extending portion extends to the outer side of the outer surface of the first housing wall, the electrode post cover plate covers an outer side of the electrode post body, and the electrode post body is welded to the electrode post cover plate.

10. The battery cell according to claim 9, wherein the first extending portion protrudes from the pass-through portion toward an outer side of the first housing wall, to define a depressed groove between the first extending portion and the pass-through portion, an edge of the electrode post cover plate is arranged in the depressed groove and is welded to the pass-through portion in a pass-through manner, and a welding structure formed through welding is separated from the first extending portion.

11. The battery cell according to claim 1, wherein the electrode post forms the first extending portion through flanging riveting.

12. The battery cell according to claim 1, wherein mass per unit area of the second section portion is greater than mass per unit area of the first section portion.

13. The battery cell according to claim 12, wherein a thickness of the second section portion is greater than a thickness of the first section portion; and/or a density of the second section portion is greater than a density of the first section portion.

14. The battery cell according to claim 9, wherein the battery cell is provided with an accommodating cavity on an inner side of the first housing wall, the electrode post comprises the electrode post body, an accommodating groove opened toward a direction away from the accommodating cavity is formed on the electrode post body, a communication hole is provided on the electrode post body, and the communication hole penetrates a side groove wall of the accommodating groove close to the accommodating cavity and communicates the accommodating cavity with the accommodating groove.

15. The battery cell according to claim 14, wherein the battery cell comprises a battery cell assembly, the battery cell assembly comprises an active substance coated portion accommodated in the accommodating cavity and a conductive portion connected to the active substance coated portion, and the conductive portion passes through the communication hole to be at least partially accommodated in the accommodating groove.

16. The battery cell according to claim 14, wherein the electrode post comprises the electrode post cover plate covering the electrode post body, a liquid injection hole that is capable of being in communication with the accommodating groove is formed on the electrode post cover plate, and the battery cell further comprises a sealing structure configured to seal the liquid injection hole.

17. A battery, comprising the battery cell according to claim 1.

18. A power consuming device, comprising the battery according to claim 17.

19. The battery cell according to claim 1, wherein, a dimension of the first extending portion in a radial direction of the mounting hole is L0, a dimension of a part of the first extending portion corresponding to an intersection region with the first housing wall in a radial direction of the mounting hole is L3, L3 is greater than or equal to one half of L0.

20. The battery cell according to claim 1, wherein, an extension dimension of the first section portion in the direction away from the central axis of the mounting hole is L1, an extension dimension of the second section portion in the direction away from the central axis of the mounting hole is L2, L1 is less than L2.

21. The battery cell according to claim 1, wherein, an extension dimension of a part of the first extending portion abutting against the first housing wall in the direction away from the central axis of the mounting hole is L3, a wall thickness of the first housing wall is D, $0.5D \leq L3 \leq 2D$.

* * * * *